US012792523B2

(12) United States Patent
Kim

(10) Patent No.: US 12,792,523 B2
(45) Date of Patent: Nov. 10, 2026

(54) COMPUTATIONAL STORAGE DEVICE AND DATA PROCESSING SYSTEM INCLUDING COMPUTATIONAL STORAGE DEVICE

(71) Applicant: SK hynix Inc., Gyeonggi-do (KR)

(72) Inventor: Soo Jin Kim, Gyeonggi-do (KR)

(73) Assignee: SK hynix Inc, Gyeonggi-do (KR)

( * ) Notice: Subject to any disclaimer, the term of this patent is extended or adjusted under 35 U.S.C. 154(b) by 0 days.

(21) Appl. No.: 18/425,490

(22) Filed: Jan. 29, 2024

(65) Prior Publication Data

US 2025/0130954 A1 Apr. 24, 2025

(30) Foreign Application Priority Data

Oct. 18, 2023 (KR) ........................ 10-2023-0139537

(51) Int. Cl.
*G06F 12/1027* (2016.01)

(52) U.S. Cl.
CPC ................................ *G06F 12/1027* (2013.01)

(58) Field of Classification Search
None
See application file for complete search history.

(56) References Cited

U.S. PATENT DOCUMENTS

| | | | | |
|---|---|---|---|---|
| 2013/0007381 | A1* | 1/2013 | Palmer | G06F 12/0246 711/E12.001 |
| 2015/0089115 | A1* | 3/2015 | Suenaga | G06F 3/0631 711/4 |
| 2017/0255565 | A1* | 9/2017 | Mosiolek | G06F 12/0238 |
| 2018/0293161 | A1* | 10/2018 | Nellayi | G06F 3/067 |
| 2019/0258403 | A1* | 8/2019 | Kim | G06F 12/0246 |
| 2020/0081830 | A1* | 3/2020 | Desai | G06F 12/0246 |
| 2020/0241784 | A1* | 7/2020 | Mayo | G06F 3/0608 |
| 2021/0342103 | A1 | 11/2021 | Khan et al. | |
| 2022/0222235 | A1 | 7/2022 | Menghani | |
| 2022/0398442 | A1 | 12/2022 | Jones | |
| 2022/0405580 | A1* | 12/2022 | Zheng | G06F 18/24147 |
| 2024/0264863 | A1* | 8/2024 | Yang | G06F 9/3836 |
| 2025/0110899 | A1* | 4/2025 | Punniyamurthy | G06N 3/08 |

FOREIGN PATENT DOCUMENTS

| | | |
|---|---|---|
| KR | 20180011375 A | 2/2018 |
| KR | 20230068992 A | 5/2023 |

OTHER PUBLICATIONS

SNIA Standard Version 1.0, Computational Storage Architecture and Programming Model, Aug. 30, 2022.
Kurt Marko, How the computational storage drive is changing computing, Dec. 11, 2020, TechTarget, Available at https://www.techtarget.com/searchstorage/feature/How-the-computational-storage-drive-is-changing-computing.

* cited by examiner

*Primary Examiner* — Stephanie Wu
(74) *Attorney, Agent, or Firm* — IP&T GROUP LLP

(57) ABSTRACT

A computational storage device includes a memory device configured to store therein a data unit group including a plurality of data units; and a controller configured to: calculate, based on a computational operation request, one or more logical addresses, to which a target data unit that is included in the data unit group has been allocated and is a target of a computational operation to be performed in response to the computational operation request, calculate a start logical address and a start offset of the target data unit based on information, the start logical address being included in the one or more logical addresses, read, from the memory device, data corresponding to the one or more logical addresses, and identify the target data unit in the read data.

18 Claims, 12 Drawing Sheets

FIG. 4

RQ1 : SELECT *FROM TB1 WHERE (C4>100) AND (C6=2)

IF_RQ1 start_addr = 0x0
row_total = 7
col_total = 70
val_size = 8
type = SELECT
tar_offset = 4, 6
tar_offset_total = 2
op = ">", "=", "&"
op_total = 3
const = 'd100, 'd2
const_total = 2 row_size = 560B row_start_addr = 0x0 row_last_addr = 0x228

INDEX CONTROLLER (302)

IDX_R0

| valid | row_num | start_lba | start_offset | last_lba | last_offset |
|---|---|---|---|---|---|
| 1 | 0 | 0x0 (LBA0) | 0x0 | 0x200 (LBA1) | 0x30 (48B) |

MT_R0

| row_num | lba_total | start_offset | last_offset |
|---|---|---|---|
| 0 | 2 | 0x0 | 0x30 (48B) |

row_size = 560B row_start_addr = 0x230 row_last_addr = 0x458

INDEX CONTROLLER (302)

IDX_R1

| valid | row_num | start_lba | start_offset | last_lba | last_offset |
|---|---|---|---|---|---|
| 1 | 1 | 0x200 (LBA1) | 0x30 (48B) | 0x400 (LBA2) | 0x60 (48B) |

MT_R1

| row_num | lba_total | start_offset | last_offset |
|---|---|---|---|
| 1 | 2 | 0x30 (48B) | 0x60 (96B) |

INDEX CONTROLLER (302)

IDX_R2

| valid | row_num | start_lba | start_offset | last_lba | last_offset |
|---|---|---|---|---|---|
| 1 | 2 | 0x400 (LBA2) | 0x60 (96B) | 0x600 (LBA3) | 0x90 (144B) |

MT_R2

| row_num | lba_total | start_offset | last_offset |
|---|---|---|---|
| 2 | 2 | 0x60 (96B) | 0x90 (144B) |

READ DATA BUFFER (305)

FIG. 7

| | valid | row_num | start_lba | ⋯ | last_lba | ⋯ |
|---|---|---|---|---|---|---|
| IDX_R0 | 1 | 0 | 0x0 | | 0x200 | |
| IDX_R1 | 1 | 1 | 0x200 | | 0x400 | |
| IDX_R2 | 1 | 2 | 0x400 | | 0x600 | |
| | ⋯ | ⋯ | ⋯ | ⋯ | ⋯ | ⋯ |
| IDX_R6 | 1 | 6 | 0xC00 | | 0xE00 | |

| | valid | row_num | start_lba | ⋯ | last_lba | ⋯ |
|---|---|---|---|---|---|---|
| | 1 | 0 | 0x0 | | 0x200 | |
| | 1 | 2 | 0x200 | | 0x400 | |
| | 1 | 3 | 0x400 | | 0x600 | |
| | ⋯ | ⋯ | ⋯ | ⋯ | ⋯ | ⋯ |
| | 1 | 7 | 0xC00 | | 0xE00 | |
| IDX_NR1 | 1 | 1 | 0xE00 (LBA7) | | 0xG00 (LBA8) | |

vt_size = 120B vt_start_addr = 0x168 unaligned_flag = 0

INDEX CONTROLLER (302)

IDX_V3

| valid | vt_num | start_lba | start_offset | last_lba | last_offset |
|---|---|---|---|---|---|
| 1 | 3 | 0x0 (LBA0) | 0x168 (360B) | 0x0 (LBA0) | 0x1E0 (480B) |

MT_V3

| vt_num | lba_total | start_offset | last_offset |
|---|---|---|---|
| 3 | 1 | 0x168 (360B) | 0x1E0 (480B) |

vt_size = 120B vt_start_addr = 0x1E0 unaligned_flag = 1

INDEX CONTROLLER (302)

IDX_V4

| valid | vt_num | start_lba | start_offset | last_lba | last_offset |
|---|---|---|---|---|---|
| 1 | 4 | 0x0 (LBA0) | 0x1E0 (480B) | 0x200 (LBA1) | 0x58 (88B) |

MT_V4

| vt_num | lba_total | start_offset | last_offset |
|---|---|---|---|
| 4 | 2 | 0x1E0 (480B) | 0x58 (88B) |

COMPUTATIONAL STORAGE DEVICE AND DATA PROCESSING SYSTEM INCLUDING COMPUTATIONAL STORAGE DEVICE

CROSS-REFERENCES TO RELATED APPLICATION

The present application claims priority under 35 U.S.C. § 119(a) to Korean Patent Application No. 10-2023-0139537, filed on Oct. 18, 2023, which is incorporated herein by reference in its entirety.

BACKGROUND

1. Technical Field

Various embodiments of the present disclosure relate to a computational storage device and a data processing system including the computational storage device.

2. Related Art

A storage device may be configured to store data that are provided by an external host device in response to a write request from the host device. Furthermore, the storage device may be configured to provide the host device with the stored data in response to a read request from the host device. The host device is an electronic device capable of processing data, and may include a computer, a digital camera, or a mobile phone. The storage device may operate by being embedded in the host device or may be fabricated in a separable form and operate by being electrically coupled to the host device. The storage device may include a memory device for storing data.

A computational storage device may be a storage device capable of performing data processing and computation operations under the control of a host device. The computational storage device may decrease a burden of data processing and the delay time of data processing of the host device. Furthermore, if the computational storage device processes data having a large size, the computational storage device can effectively reduce a burden of a bandwidth by minimizing a data movement to the host device.

SUMMARY

In an embodiment of the present disclosure, a computational storage device may include a memory device configured to store therein a data unit group including a plurality of data units; and a controller configured to: calculate, based on a computational operation request, one or more logical addresses, to which a target data unit that is included in the data unit group has been allocated and is a target of a computational operation to be performed in response to the computational operation request, calculate a start logical address and a start offset of the target data unit based on information, the start logical address being included in the one or more logical addresses, read, from the memory device, data corresponding to the one or more logical addresses, and identify the target data unit in the read data. The computational operation request may include the information of a start logical address of the data unit group and a size of each of the plurality of data units.

In an embodiment of the present disclosure, a computational storage device may include a memory device configured to store therein a data unit group including a plurality of data units; and a controller configured to: calculate a first logical address, to which a selected part of a target data unit included in the data unit group have been allocated, and an unaligned flag for the target data unit, calculate, when the target data unit is determined to be unaligned data according to the unaligned flag, a second logical address, to which a remaining part of the target data unit has been allocated, read, from the memory device, first read data corresponding to the first logical address and second read data corresponding to the second logical address, and obtain the target data unit from the first read data and the second read data.

In an embodiment of the present disclosure, a data processing system may include a computational storage device configured to allocate consecutive logical addresses to a data unit group when storing therein the data unit group; and a host device configured to transmit, to the computational storage device, a computational operation request for the data unit group. The computational storage device may perform a computational operation on the data unit group in response to the computational operation request.

Other features, aspects, and advantages of the present invention will become apparent from the following detailed description, the drawings, and the claims.

BRIEF DESCRIPTION OF THE DRAWINGS

FIG. 4 is a diagram illustrating operation information that is included in a first computational operation request and a first computational operation request for the table of FIG. 2 according to an embodiment of the present disclosure.

FIG. 7 is a diagram for describing a method of allocating, by the computational function accelerator, another data to be added to a table to one or more logical addresses according to an embodiment of the present disclosure.

DETAILED DESCRIPTION

Hereinafter, embodiments of the present disclosure will be described in detail with reference to the accompanying drawings.

Figure 1:
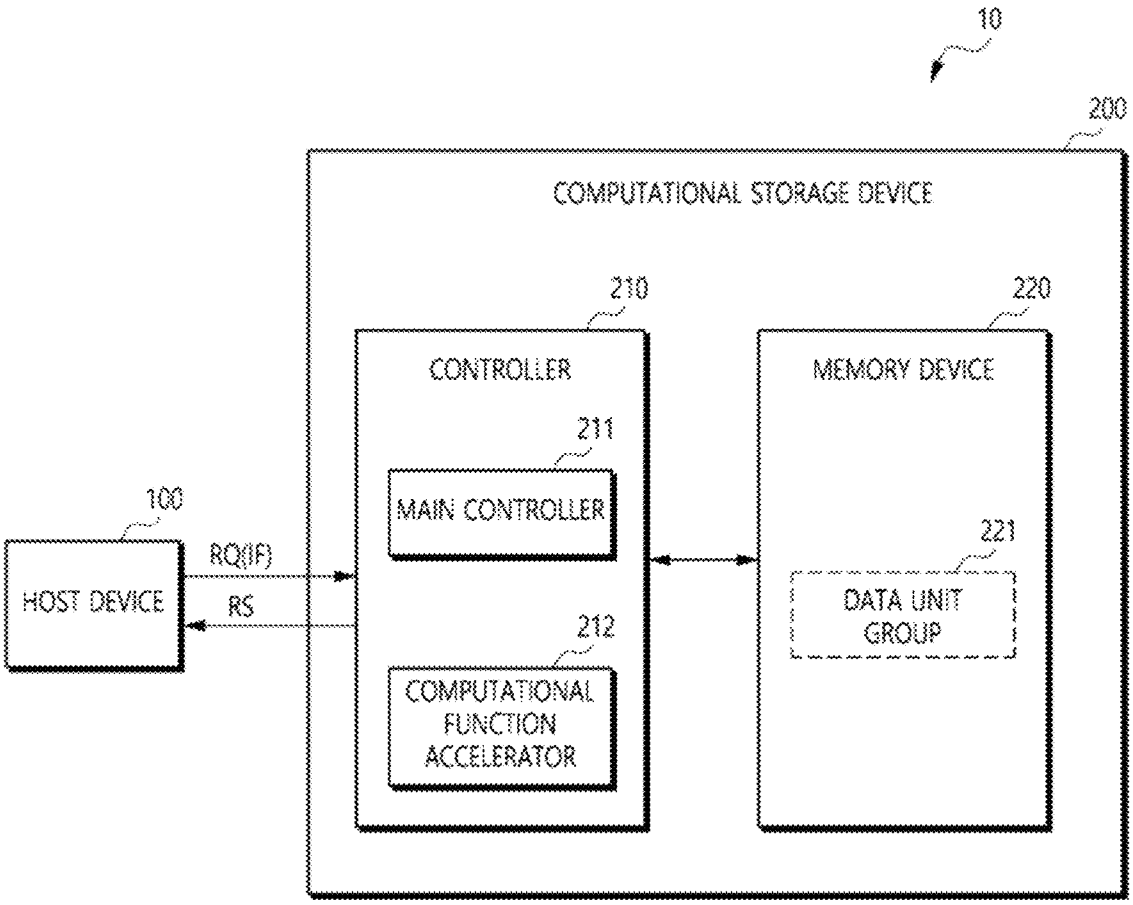
FIG. 1 is a block diagram illustrating a data processing system including a computational storage device according to an embodiment of the present disclosure.

FIG. 1 is a block diagram illustrating a data processing system 10 including a computational storage device 200 according to an embodiment of the present disclosure.

The data processing system 10 may include a host device 100 and the computational storage device 200.

The host device 100 may control the computational storage device 200 by transmitting an operation request RQ to the computational storage device 200. The operation request RQ may include a write operation request, a read operation request, and a computational operation request. For example, the host device 100 may store data in the computational storage device 200 through the write operation request. Furthermore, the host device 100 may read data that have been stored in the computational storage device 200 through the read operation request.

Furthermore, the host device 100 may control, through the computational operation request, the computational storage device 200 to perform a computational operation for data that have been stored in the computational storage device 200. For example, the computational operation request may be a request for a computational operation for one or more data units of a data unit group 221 that has been stored in the computational storage device 200. The data unit may be a unit in which a computational operation is performed on the data unit group 221 depending on a computational operation type. As will be described later, the data unit may be a unit in which a computational function accelerator 212 generates an index. The data unit group 221 may consist of a plurality of data units.

For example, when the data unit group 221 is a database table, the data unit may be each row or each column that is included in the database table. When the data unit group 221 is an embedding table, the data unit may be each vector data unit that is included in the embedding table. Hereinafter, a data unit on which a computational operation is to be performed by a computational operation request, among the data units of the data unit group 221, may be referred to as a target data unit.

The operation request RQ may include operation information IF, that is, information that is necessary for the computational storage device 200 to perform an operation requested by the operation request RQ. The operation information IF of the computational operation request may include data unit group information and computational operation information.

The data unit group information may selectively include information with regard to the start logical address of the data unit group 221, a number of data units included in the data unit group 221, a number of elements that are included in each data unit, a size of the data unit, and a size of the element. The start logical address of the data unit group 221 may be the foremost logical address among logical addresses, to which the data unit group 221 has been allocated.

According to an embodiment, if the computational storage device 200 is previously aware of the start logical address of the data unit group 221, the start logical address of the data unit group 221 might not be transmitted as the operation information IF.

The computational operation information may selectively include information with regard to a computational operation type, respective sequence numbers of one or more target data units, a number of the target data units, one or more target offsets, a number of the target offsets, one or more condition operations, a number of the condition operations, one or more constants, and a number of the constants.

Specifically, the computational operation type may be the type of computational operation that has been requested by a computational operation request. The computational operation type of the database table may include a SELECT operation, a PROJECT operation, a REMOVE operation, an ADD operation, or a MODIFY operation. The computational operation type of the embedding table may include an average aggregation operation, a weighted average aggregation operation, a maximum value aggregation operation, or a sum aggregation operation.

When each target data unit consists of a plurality of elements, a target offset may indicate an element on which a computational operation is to be performed in a corresponding target data unit. The condition operation may be an operation that is included in condition (e.g., a WHERE syntax in a computational operation request which has been written in a structured query language (SQL) or an IF sentence in a computational operation request which has been written in various programming languages) for a computational operation request. The constant may be a constant that is included in a condition for a computational operation request.

The computational storage device 200 may receive a computational operation request from the host device 100 and perform a computational operation requested by the computational operation request. For example, the computational storage device 200 may perform a write operation on the memory device 220 in response to a write operation request from the host device 100. Furthermore, the computational storage device 200 may perform a read operation on the memory device 220 in response to a read operation request from the host device 100.

Furthermore, the computational storage device 200 may perform a computational operation on one or more target data units that are included in the data unit group 221, in response to a computational operation request for the data unit group 221, and may transmit the operation result RS to the host device 100 as the results of the execution of the computational operation.

The computational storage device 200 may include a controller 210 and a memory device 220.

The controller 210 may control the memory device 220 in response to the operation request RQ. The controller 210 may calculate one or more logical addresses to which a target data unit included in the data unit group 221 has been allocated, in response to a computational operation request for the data unit group 221, may read, from the memory device 220, read data corresponding to the one or more logical addresses, may identify the target data unit in the read data, and may perform a computational operation on the target data unit.

The controller 210 can effectively calculate one or more logical addresses to which a target data unit has been allocated, regardless of whether the target data unit has a size greater than or less than a maximum size allocable to each logical address (i.e., a data size that the host device 100 can allocate for one logical address, for example, 512 B). Although a target data unit is unaligned data that is allocated to two or more logical addresses, the controller 210 can effectively calculate one or more logical addresses to which the target data unit has been allocated.

The controller 210 may include a main controller 211 and the computational function accelerator 212.

The main controller 211 may receive the operation request RQ from the host device 100 and may perform an operation requested by the operation request RQ. The main controller 211 may perform a write operation and a read operation on the memory device 220 in response to the operation request RQ.

When receiving a computational operation request from the host device 100, the main controller 211 may transmit the computational operation request or the operation information IF to the computational function accelerator 212. Furthermore, the main controller 211 may receive a logical address to which a target data unit has been allocated from the computational function accelerator 212 and may access the memory device 220 based on the logical address. Specifically, the main controller 211 may convert the logical address received from the computational function accelerator 212 into a physical address and may access a memory region corresponding to the physical address in the memory device 220. The main controller 211 may manage mapping information between the logical address and the physical address.

Although not illustrated, the main controller 211 may selectively include a host interface that is electrically coupled to the host device 100, and a memory controller, memory, and a processor that are electrically coupled to the memory device 220.

The computational function accelerator 212 may determine a target data unit that has been included in the data unit group 221 based on the operation information IF of the computational operation request and may determine one or more logical addresses to which the target data unit has been allocated.

Furthermore, the computational function accelerator 212 may determine a start offset and last offset of a target data unit based on the operation information IF of the computational operation request. The start offset of the target data unit may correspond to the number of bytes from the foremost location of read data corresponding to the start logical address of the target data unit to a location at which the target data unit is started. The last offset of the target data unit may correspond to the number of bytes from the foremost location of read data corresponding to the last logical address of the target data unit to a location at which the target data unit is ended. In the present disclosure, a foremost location of a data unit may refer to a location where the data unit starts within read data corresponding to a start logical address of the data unit.

Furthermore, when read data corresponding to one or more logical addresses to which a target data unit has been allocated are output by the memory device 220 under the control of the main controller 211, the computational function accelerator 212 may obtain the target data unit from the read data based on a start offset and last offset of the target data unit. The computational function accelerator 212 may perform a computational operation on the target data unit.

The computational function accelerator 212 may generate the index of a target data unit in response to the operation request RQ and may store the index of the target data unit in a separate location (e.g., an index cache 303 in FIG. 3) for reuse. The index of the target data unit may include information regarding the target data unit. The index of the target data unit may include a start logical address and the last logical address, among one or more logical addresses to which the target data unit has been allocated, a start offset of the target data unit, and the last offset of the target data unit. When receiving another computational n request, the computational function accelerator 212 may confirm information of a target data unit with reference to an index that has been stored in the index cache 303 if the index of the target data unit for the another computational operation request has already been stored in the index cache 303.

Furthermore, when the data unit group 221 is changed (e.g., when another data unit is added to the data unit group 221 or when a specific data unit is removed from the data unit group 221) in response to the operation request RQ of the host device 100, the computational function accelerator 212 can efficiently manage the data unit group 221 by modifying indices that have been stored in the index cache 303.

According to an embodiment, when storing the data unit group 221 in the memory device 220 under the control of the host device 100, the main controller 211 may allocate consecutive logical addresses to the data unit group 221. The main controller 211 may map the logical addresses to which the data unit group 221 has been allocated to physical addresses of memory regions in which the data unit group 221 has been stored, respectively, in the memory device 220. The main controller 211 may transmit the foremost logical address, among the logical addresses to which the data unit group 221 has been allocated, that is, the start logical address of the data unit group 221, to the host device 100. The host device 100 may previously designate the range of logical addresses to which the data unit group 221 may be allocated for the main controller 211. The main controller 211 may store the data unit group 221 in the memory device 220 and may then calculate one or more logical addresses that have been allocated to the target data unit in response to a computational operation request for the data unit group 221.

According to an embodiment, when storing the data unit group 221 in the computational storage device 200, the host device 100 may allocate the data unit group 221 to consecutive logical addresses. The host device 100 may transmit a write operation request for the data unit group 221 to the computational storage device 200 along with the logical addresses to which the data unit group 221 has been allocated.

The memory device 220 may operate under the control of the controller 210. The memory device 220 may perform a read operation, a write operation (namely, a program operation), and an erase operation under the control of the controller 210. The memory device 220 may receive a physical address from the controller 210 and may access a memory region corresponding to the physical address.

According to an embodiment, the host device 100 may be an electronic device capable of processing data, and may include a computer, a digital camera, a mobile phone, a drone, a server, and a transport system.

According to an embodiment, the computational storage device 200 may be a storage device including the computational function accelerator 212. The storage device may include a personal computer memory card international association (PCMCIA) card, a smart media card, a memory stick, various multimedia cards (e.g., an MMC, an eMMC, an RS-MMC, and MMC-micro), secure digital (SD) cards (e.g., SD, mini-SD, and micro-SD), universal flash storage (UFS), or a solid state drive (SSD).

According to an embodiment, the memory device 220 may include various types of memory, such as NAND flash memory, NOR flash memory, resistive random access memory (RRAM), phase change random access memory (PRAM), magnetoresistive random access memory (MRAM), ferroelectric random access memory (FRAM), or spin transfer torque random access memory (STTRAM).

Figure 2:
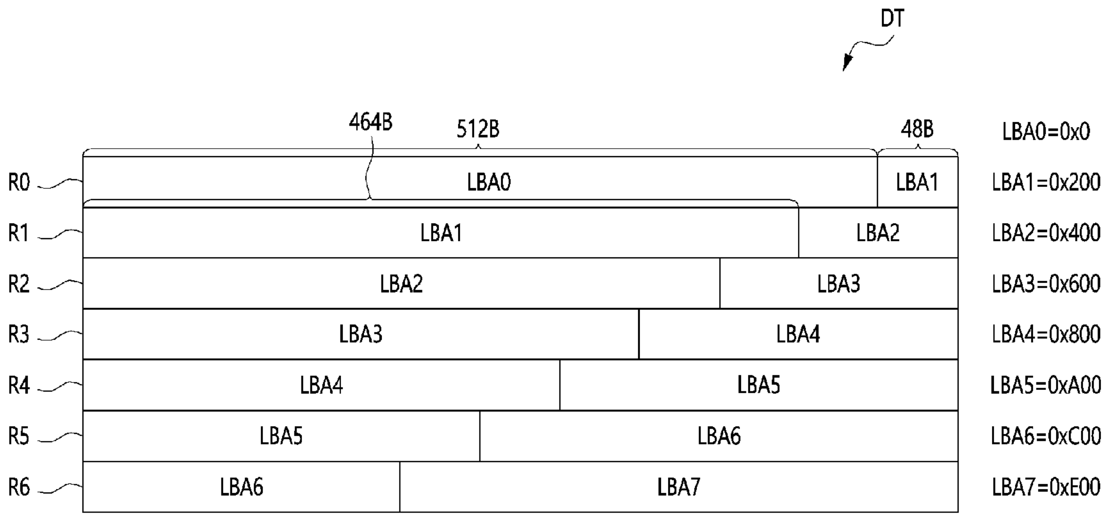
FIG. 2 is a diagram for describing logical addresses to which a table has been allocated according to an embodiment of the present disclosure.

FIG. 2 is a diagram for describing logical addresses to which a table DT has been allocated according to an embodiment of the present disclosure. The table DT may be an example of the data unit group 221 illustrated in FIG. 1.

Referring to FIG. 2, the table DT may be a database table DT including rows and columns. For example, the table DT may include seven row data units R0 to R6 each having a size of 560 B. Each element included in the table DT may have a size of 8 B. That is, each of the row data units R0 to R6 may include seventy elements, thus, the table DT may include seventy columns. The size of each row data unit may be greater than a maximum data size which is allocable to each logical address, for example, 512 B.

The table DT may be stored in the memory device 220 in row major ordering. When storing the table DT in the memory device 220 under the control of the host device 100, the main controller 211 may allocate the row data units R0 to R6 that have been sequentially listed to consecutive logical addresses LBA0 to LBA7 in a 512 B unit. In this case, each of the row data units R0 to R6 may be allocated to two logical addresses. The foremost logical address, among the logical addresses to which each row data unit has been allocated, may be referred to as the start logical address of the row data unit. A last logical address, among the logical addresses to which each row data unit has been allocated, may be referred to as the last logical address of the row data unit. When storing data allocated to each logical address in a memory region of the memory device 220, the main controller 211 may map each logical address to the physical address of the memory region.

For example, the row data unit No. 0 (R0) may be allocated to logical addresses LBA0 and LBA1. The logical address No. 0 (LBA0) may be the start logical address of the row data unit No. 0 (R0). The logical address No. 1 (LBA1) may be the last logical address of the row data unit No. 0 (R0). Anterior 512 B of the row data unit No. 0 (R0), that is, sixty-four elements from the column No. 0 to the column No. 63, may be allocated to the logical address No. 0 (LBA0). Furthermore, posterior 48 B of the row data unit No. 0 (R0), that is, six elements from the column No. 64 to the column No. 69, may be allocated to the logical address No. 1 (LBA1). In this case, after posterior 48 B of the row data unit No. 0 (R0), anterior 464 B of the row data unit No. 1 (R1), that is, fifty-eight elements from the column No. 0 to the column No. 57, may be allocated to the logical address No. 1 (LBA1).

In this way, the row data units R0 to R6 may be sequentially allocated from the logical address No. 0 (LBA0) to the logical address No. 7 (LBA7). The start logical address of the table DT may be the foremost logical address No. 0 (LBA0), among the logical addresses LBA0 to LBA7 allocated to the table DT. The last logical address of the table DT may be the last logical address No. 7 (LBA7), among the logical addresses LBA0 to LBA7 allocated to the table DT. It may be an example that the start logical address of the table DT is the logical address No. 0 (LBA0). In the logical address space of the data processing system 10, the number of bytes from the start location of the logical address No. 0 (LBA0) to a location at which each logical address is started may be represented as each logical address as follows. The logical addresses LBA0 to LBA7 may be represented as 0x0, 0x200, 0x400, 0x600, 0x800, 0xA00, 0xC00, and 0xE00, respectively.

According to an embodiment, when the size of each row data unit of table is greater than 1024 B, each row data unit may be allocated to three or more logical addresses. Each row data unit that is allocated to a plurality of logical addresses may be unaligned data.

When the table DT is stored in a storage device not having a computational function, the host device 100 may directly allocate each row data unit of the table DT to the logical addresses LBA0 to LBA7 and may manage allocation information. Furthermore, if a computational operation for the row data unit No. 0 (R0) of the table DT has to be modified, the host device 100 may transmit a read operation request for the logical addresses LBA0 and LBA1 to the storage device. Furthermore, the host device 100 may obtain all read data corresponding to the logical address No. 0 (LBA0), among read data that are output by the storage device, and data of anterior 48 B, among read data corresponding to the logical address No. 1 (LBA1), as the row data unit No. 0 (R0). However, in accordance with an embodiment, the computational storage device 200 instead of the host device 100 can more efficiently perform a computational operation on the row data unit No. 0 (R0) by directly calculating the logical addresses LBA0 and LBA1 to which the row data unit No. 0 (R0) has been allocated.

Figure 3:
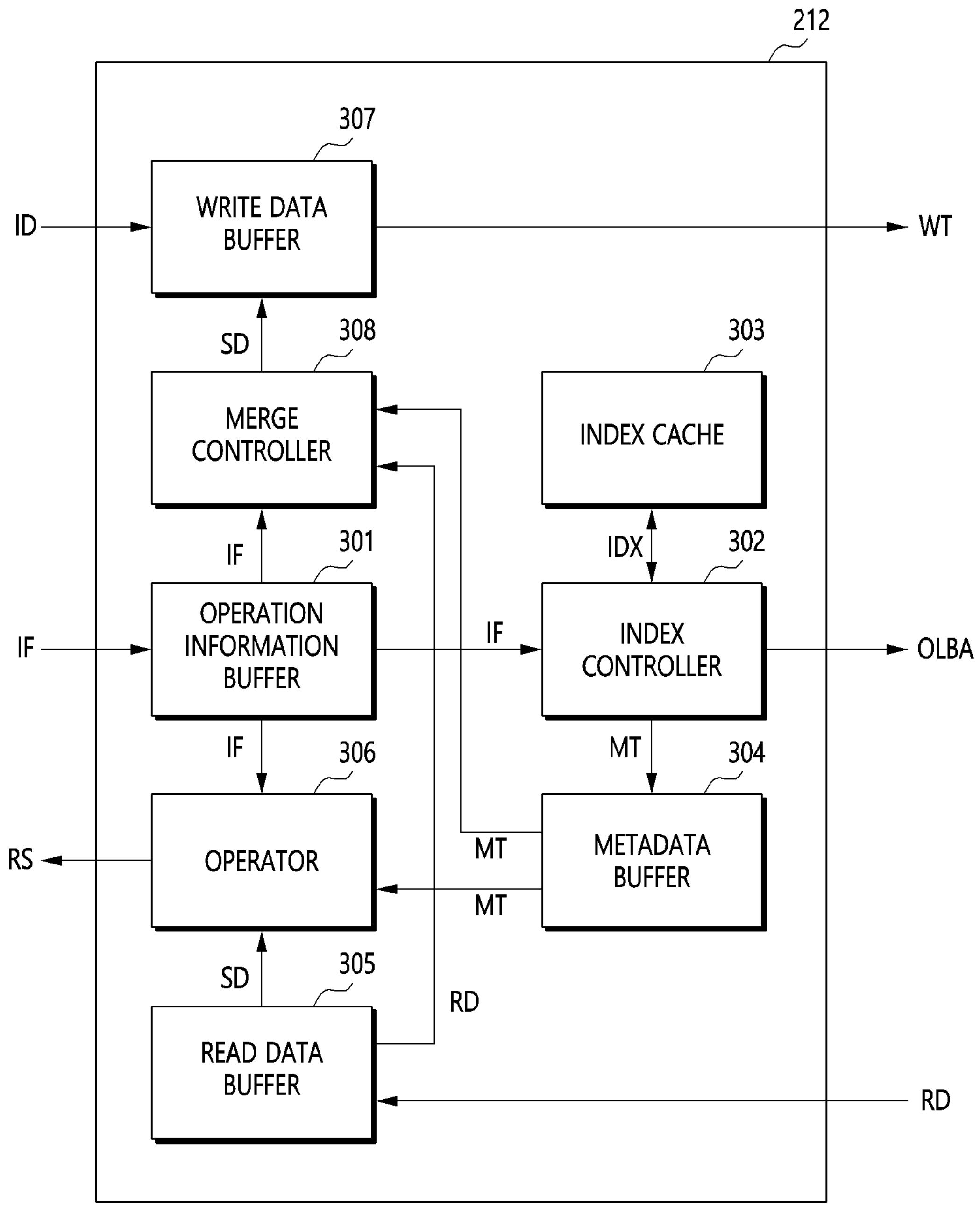
FIG. 3 is a block diagram illustrating a computational function accelerator of FIG. 1 according to an embodiment of the present disclosure.

FIG. 3 is a block diagram illustrating the computational function accelerator 212 of FIG. 1 according to an embodiment of the present disclosure.

Referring to FIG. 3, the computational function accelerator 212 may include an operation information buffer 301, an index controller 302, the index cache 303, a metadata buffer 304, a read data buffer 305, an operator 306, a write data buffer 307, and a merge controller 308. All components that are included in the computational function accelerator 212 may be embodied as hardware, software, firmware, or a combination of them which can perform operations to be described later.

The operation information buffer 301 may store the operation information IF that is transmitted by the main controller 211. The operation information buffer 301 may transmit the operation information IF to a corresponding component under the control of another component (e.g., the index controller 302, the operator 306, or the merge controller 308).

The index controller 302 may calculate one or more logical addresses to which a target data unit of the data unit group 221 has been allocated based on the operation information IF and may output each of the one or more logical addresses to the main controller 211 as an output logical address OLBA. The one or more logical addresses of a target data unit may include start and last logical addresses of the target data unit.

Specifically, the index controller 302 may generate an index IDX of a target data unit based on the operation information IF and store the index IDX in the index cache 303. The index controller 302 may generate the index IDX in the unit of the target data unit. Accordingly, if the table DT has been stored in the memory device 220 in row major ordering, the index IDX may include information regarding a target row data unit. The index controller 302 may generate, based on the operation information IF, a plurality of indices respectively corresponding to a plurality of target row data units. The index cache 303 may store the indices of the plurality of row data units corresponding to the respective target row data units.

Specifically, the index IDX of each row data unit may include information with regard to a corresponding row data unit, for example, validity information, a sequence number of the row data unit, the start logical address of the row data unit, the start offset of the row data unit, the last logical address of the row data unit, and the last offset of the row data unit. The validity information may indicate whether a corresponding index IDX is valid.

According to an embodiment, the index controller 302 may calculate information to be included in the index IDX of each row data unit based on Equations F1 to F9. Equations F1 to F9 may be applicable when the data unit group or the table DT is allocated to the consecutive logical addresses and each size of the row data units is greater than a data size allocable to each logical address.

$$\text{the size (row\_size) of a row data unit} = \text{col\_total} * \text{val\_size}. \quad \text{Equation 1 (F1)}$$

$$\text{the start address (row\_start\_addr) of a row data unit} = \text{start\_addr} + (\text{row\_size} * \text{row\_num}). \quad \text{Equation 2 (F2)}$$

$$\text{the last address (row\_last\_addr) of a row data unit} = \text{row\_start\_addr} + \text{row\_size} - \text{val\_size}. \quad \text{Equation 3 (F3)}$$

$$\text{the start logical address (start\_lba) of a row data unit} = (\text{row\_start\_addr} \gg 9) \ll 9. \quad \text{Equation 4 (F4)}$$

$$\text{the last logical address (last\_lba) of a row data unit} = (\text{row\_last\_addr} \gg 9) \ll 9. \quad \text{Equation 5 (F5)}$$

$$\text{the number (lba\_total) of logical addresses} = (\text{last\_lba} - \text{start\_lba}) \gg 9 + 1. \quad \text{Equation 6 (F6)}$$

$$\text{the size difference (size\_diff)} = \max(\text{lba\_size}, \text{row\_size}) - \min(\text{lba\_size}, \text{row\_size}). \quad \text{Equation 7 (F7)}$$

$$\text{the start offset (start\_offset) of a row data unit} = \text{size\_diff} * \text{row\_num}. \quad \text{Equation 8 (F8)}$$

$$\text{the last offset (last\_offset) of a row data unit} = \text{size\_diff} * (\text{row\_num} + 1). \quad \text{Equation 9 (F9)}$$

In Equation 1 (F1), the size (row_size) of the row data unit may be the size of one row data unit. The parameter "col_total" may be the number of columns that are included in the table DT, and the parameter "val_size" may be the size of one element.

In Equation 2 (F2), the start address (row_start_addr) of the row data unit may be the number of bytes from the foremost location of the table DT, that is, the first element to a location at which the row data unit is started. The start_addr may be the start logical address of the table DT. The parameter "row_num" may be the sequence number of the row data unit.

In Equation 3 (F3), the last address (row_last_addr) of the row data unit may be the number of bytes from the first element of the table DT to a location before the last 8 B (i.e., the last element) of the row data unit.

In Equation 4 (F4), the start logical address (start_Iba) of the row data unit may be the foremost logical address, to which the row data unit is allocated among logical addresses.

In Equation 5 (F5), the last logical address (last_Iba) of the row data unit may be the last logical address, to which the row data unit is allocated among logical addresses.

In Equation 6 (F6), the number (Iba_total) of logical addresses may be the number of logical addresses, to which the row data unit is allocated.

In Equation 7 (F7), the size difference (size_diff) may be a difference between the size (row_size) of the row data unit and a size (Iba_size) corresponding to one logical address.

In Equation 8 (F8), the start offset (start_offset) of the row data unit may be the number of bytes from the foremost location of data corresponding to the start logical address (start_Iba) of the row data unit to a location at which the row data unit is started.

In Equation 9 (F9), the last offset (last_offset) of the row data unit may be the number of bytes from the foremost location of data corresponding to the last logical address (last_Iba) of the row data unit to a location at which the row data unit is ended.

If the index IDX of a target data unit has already been stored in the index cache 303, the index controller 302 may skip a process of generating the index IDX. Furthermore, the index controller 302 may refer to the index IDX that has already been stored in the index cache 303 in order to obtain a target data unit. According to an embodiment, indices that have been stored in the index cache 303 may be backed up in the memory device 220.

The index controller 302 may sequentially output each of one or more logical addresses to which a target data unit has been allocated as the output logical address OLBA based on the index IDX. The main controller 211 may access the memory device 220 based on the output logical address OLBA that is output by the index controller 302. Specifically, the main controller 211 may convert the output logical address OLBA into a physical address of the memory device 220, and may control a read operation or write operation on a memory region corresponding to the physical address of the memory device 220.

For example, for a computational operation that requires a read operation of the memory device 220, the index controller 302 may sequentially output each of one or more logical addresses to which a target row data unit has been allocated as the output logical address OLBA. The main controller 211 may control the memory device 220 to output read data RD including a target row data unit, based on the output logical address OLBA. The read data RD that are output by the memory device 220 may be stored in the read data buffer 305.

Furthermore, the index controller 302 may determine whether the read data RD including a target data unit has already been stored in the read data buffer 305. For example, the index controller 302 may be aware of whether the read data RD has already been stored in the read data buffer 305 by checking the read data buffer 305 through a buffer controller (not illustrated). If the read data RD has already been stored in the read data buffer 305, the index controller 302 might not output a logical address corresponding to the read data RD as an output address. Accordingly, the memory device 220 might not perform an unnecessary read operation. The index controller 302 may notify other component units of the computational function accelerator 212 that a computational operation can be performed by using the read data RD that have already been stored in the read data buffer 305.

Furthermore, the index controller 302 may generate metadata MT of a target data unit based on the index IDX of the target data unit and may store the metadata MT in the metadata buffer 304. For example, the metadata MT of a target row data unit may include information on which the target row data unit can be identified in the read data RD that are output by the memory device 220.

Specifically, the metadata MT of a target row data unit may include the sequence number of the target row data unit, the number of logical addresses to which the target row data unit has been allocated, the start offset of the target row data unit, and the last offset of the target row data unit. Accordingly, as will be described later, the operator 306 may identify, as a target row data unit, data from the start offset to the last offset in the read data RD corresponding to the number of logical addresses, based on the metadata MT of the target row data unit.

The index cache 303 may store and maintain the index IDX under the control of the index controller 302. The index IDX that has been stored in the index cache 303 may be reused in a computational operation according to another computational operation request.

The metadata buffer 304 may store the metadata MT under the control of the index controller 302. According to an embodiment, the metadata MT that have been stored in the metadata buffer 304 may be removed whenever a computational operation for a target data unit is completed.

The read data buffer 305 may store the read data RD that are output by the memory device 220.

The operator 306 may read selected data SD from the read data buffer 305, based on the operation information IF received from the operation information buffer 301 and the metadata MT received from the metadata buffer 304. The selected data SD may be a part of or a whole of the target data unit depending on a computational operation type. Furthermore, the operator 306 may perform a computational operation on the selected data SD and output an operation result RS.

For example, the operator 306 may identify a target row data unit in the read data RD that have been stored in the read data buffer 305, based on the metadata MT of the target row data unit. Furthermore, the operator 306 may perform a computational operation on the target row data unit based on the operation information IF.

According to an embodiment, the computational function accelerator 212 may further include an output data buffer (not illustrated) for storing the operation result RS. The operator 306 may perform a computational operation and then control data, which need to be output as the operation result RS, to be transmitted from the read data buffer 305 to the output data buffer. The computational function accelerator 212 may output the operation result RS from the output data buffer.

The write data buffer 307 may receive and store another data from the host device 100. The write data buffer 307 may output the another data as write data WT without any change or may output data that have been modified under the control of the merge controller 308 as the write data WD. The write data WT may be stored in the memory device 220 by the main controller 211.

The merge controller 308 may operate in a computational operation including an operation of modifying the read data RD and storing the modified data in the memory device 220 as the write data WD. Specifically, the merge controller 308 may read the read data RD that have been stored in the read data buffer 305, based on the operation information IF received from the operation information buffer 301 and the metadata MT received from the metadata buffer 304. Furthermore, the merge controller 308 may modify the read data RD based on another data ID that have been stored in the write data buffer 307, and may control the write data buffer 307 to output the modified data as the write data WD. In this case, the index controller 302 may output, as the output logical address OLBA, a logical address to which the write data has been allocated based on the operation information IF. The main controller 211 may control the memory device 220 to store the write data in another memory region, and may map the output logical address OLBA to a physical address of the another memory region.

According to an embodiment, at least some of various memory components that are included in the computational function accelerator 212 may be included in one memory device. According to an embodiment, at least some of various components not the memory components included in the computational function accelerator 212 may operate by one processor.

FIG. 4 is a diagram illustrating a first computational operation request RQ1 for the table DT of FIG. 2 and operation information IF_RQ1 that is included in the first computational operation request RQ1 according to an embodiment of the present disclosure.

Referring to FIG. 4, the first computational operation request RQ1 may be for a SELECT operation of selecting one or more row data units in each of which the element of the column No. 4 is greater than 100 and the element of the column No. 6 is 2 in the table DT and outputting the selected row data units to the host device 100. In the first computational operation request RQ1, the condition for the first computational operation request RQ1 may be represented in the form of a WHERE syntax. In order to process the first computational operation request RQ1, each of all of the row data units R0 to R6 included in the table DT needs to be reviewed. Accordingly, each of all of the row data units R0 to R6 may be a target row data unit of the first computational operation request RQ1.

The first computational operation request RQ1 may include the operation information IF_RQ1. The operation information IF_RQ1 may include the start logical address (start_addr) of the table DT, the number (row_total) of row data units R0 to R6 that are included in the table DT, the number (col_total) of columns that are included in the table DT, the size (val_size) of each element of the table DT, a computational operation type (type), one or more target offsets (tar_offset), the number (tar_offset_total) of target offsets (tar_offset), one or more condition operations (op), the number (op_total) of condition operations (op), one or more constants (const), and the number (const_total) of constants (const). The target offsets (tar_offset) may indicate elements on which a computational operation is to be performed in each target row data unit. The condition operations (op) may be operations that are included in the WHERE syntax of the first computational operation request RQ1. The constants may be constants that are included in the condition for the first computational operation request RQ1.

Figure 5A:
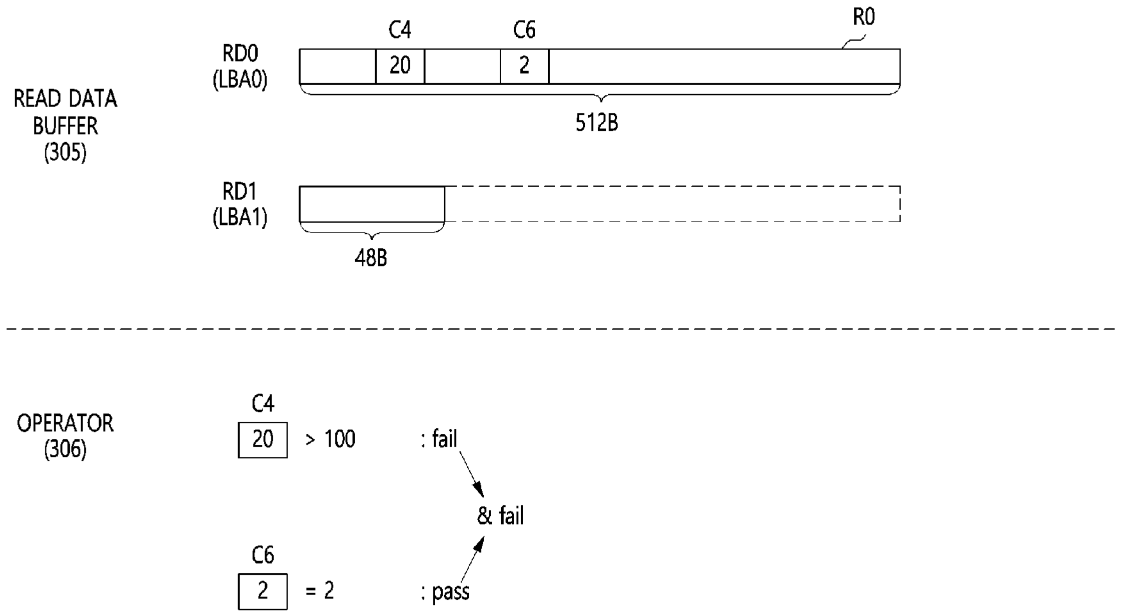
FIGS. 5A and 5B are diagrams for describing a method of processing, by the computational function accelerator, the first computational operation request of FIG. 4 according to an embodiment of the present disclosure.
Figure 5B:
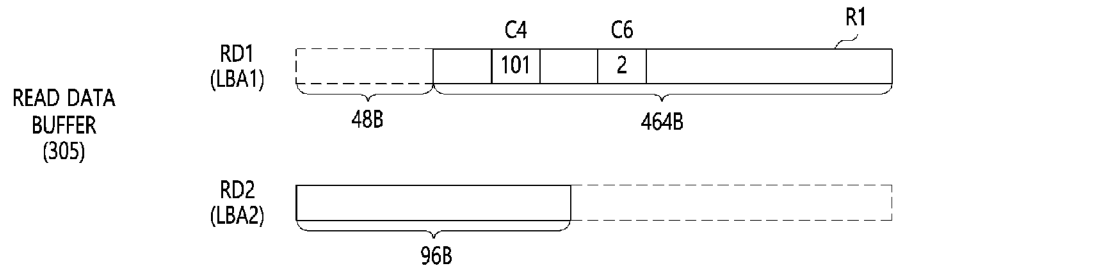
Figure 5B:
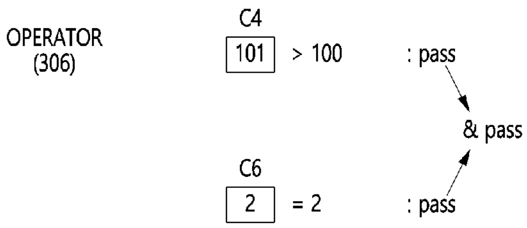

FIGS. 5A and 5B are diagrams for describing a method of processing, by the computational function accelerator 212, the first computational operation request RQ1 of FIG. 4 according to an embodiment of the present disclosure.

First, FIG. 5A illustrates a method of performing, by the computational function accelerator 212, a SELECT operation, which has been requested by the first computational operation request RQ1, on the row data unit No. 0 (R0).

Referring to FIG. 5A, the index controller 302 may operate so that read data RD0 and RD1 including the row data unit No. 0 (R0) are output from the memory device 220 to the read data buffer 305 based on the operation information IF_RQ1 of the first computational operation request RQ1.

Specifically, the index controller 302 may generate the index IDX_R0 of the row data unit No. 0 (R0) based on Equation 1 (F1) to Equation 9 (F9). The index IDX_R0 of the row data unit No. 0 (R0) may include validity information (valid), the sequence number (row_num) of the row data unit No. 0 (R0), the start logical address (start_lba) of the row data unit No. 0 (R0), the start offset (start_offset) of the row data unit No. 0 (R0), the last logical address (last_lba)

of the row data unit No. 0 (R0), and the last offset (last_offset) of the row data unit No. 0 (R0).

As described above, if the index IDX_R0 of the row data unit No. 0 (R0) has already been stored in the index cache 303 before the first computational operation request RQ1 is received, the index controller 302 might not newly generate the index IDX_R0 of the row data unit No. 0 (R0).

Furthermore, the index controller 302 may generate the metadata MT_R0 of the row data unit No. 0 (R0) and store the metadata MT_R0 in the metadata buffer 304.

The index controller 302 may determine that the start logical address (start_Iba) of the row data unit No. 0 (R0) is the logical address No. 0 (LBA0) and the last logical address (last_Iba) of the row data unit No. 0 (R0) is the logical address No. 1 (LBA1). The index controller 302 may output the logical address No. 0 (LBA0) as the output logical address OLBA so that a read operation is performed on the logical address No. 0 (LBA0). Furthermore, the index controller 302 may output the logical address No. 1 (LBA1) as the output logical address OLBA so that a read operation is performed on the logical address No. 1 (LBA1). The main controller 211 may control the memory device 220 to output the read data RD0 corresponding to the logical address No. 0 (LBA0) and the read data RD1 corresponding to the logical address No. 1 (LBA1).

The read data buffer 305 may store the read data RD0 corresponding to the logical address No. 0 (LBA0) and the read data RD1 corresponding to the logical address No. 1 (LBA1).

The operator 306 may identify the row data unit No. 0 (R0), among the read data RD0 and RD1, based on the metadata MT_R0 of the row data unit No. 0 (R0). Specifically, the operator 306 may determine that the row data unit No. 0 (R0) has been allocated to two logical addresses because the number (Iba_total) of logical addresses is 2. Furthermore, the operator 306 may determine that the entire read data RD0 corresponding to the logical address No. 0 (LBA0) is a front part of the row data unit No. 0 (R0) based on the start offset (start_offset). Furthermore, the operator 306 may identify that anterior 48 B, among the read data RD1 corresponding to the logical address No. 1 (LBA1), is the remaining part of the row data unit No. 0 (R0) based on the last offset (last_offset).

Furthermore, the operator 306 may read the element of the column No. 4 (C4) and element of the column No. 6 (C6) of the row data unit No. 0 (R0) from the read data buffer 305 based on the target offsets (tar_offset) of the operation information IF_RQ1. Furthermore, the operator 306 may perform a condition operation for the first computational operation request RQ1 on the read elements based on the condition operations (op) and constants (const) of the operation information IF_RQ1. Specifically, the operator 306 may determine that the element of the column No. 4 (C4) of the row data unit No. 0 (R0) does not satisfy (i.e., a fail) the condition for the first computational operation request RQ1. Furthermore, the operator 306 may determine that the element of the column No. 6 (C6) of the row data unit No. 0 (R0) satisfies (i.e., a pass) the condition for the first computational operation request RQ1. As a result, the operator 306 may determine that the row data unit No. 0 (R0) does not satisfy (i.e., a fail) the condition for the first computational operation request RQ1. Accordingly, the row data unit No. 0 (R0) might not be output to the host device 100.

Next, FIG. 5B illustrates a method of performing, by the computational function accelerator 212, the SELECT operation requested by the first computational operation request RQ1 on the row data unit No. 1 (R1).

Referring to FIG. 5B, the index controller 302 may generate the index IDX_R1 of the row data unit No. 1 (R1) based on Equation 1 (F1) to Equation 9 (F9). As described above, if the index IDX_R1 of the row data unit No. 1 (R1) has already been stored in the index cache 303 before the first computational operation request RQ1 is received, the index controller 302 might not newly generate the index IDX_R1 of the row data unit No. 1 (R1). Furthermore, the index controller 302 may generate the metadata MT_R1 of the row data unit No. 1 (R1) and store the metadata MT_R1 in the metadata buffer 304.

The index controller 302 may determine that the start logical address (start_Iba) of the row data unit No. 1 (R1) is the logical address No. 1 (LBA1) and the last logical address (last_Iba) of the row data unit No. 1 (R1) is the logical address No. 2 (LBA2). In this case, for example, if the memory device 220 performs a read operation on the logical address No. 1 (LBA1) for a computational operation for the row data unit No. 0 (R0) or the read data RD1 corresponding to the logical address No. 1 (LBA1) is already present in the read data buffer 305, the index controller 302 may determine that another read operation for the logical address No. 1 (LBA1) is unnecessary. Accordingly, the index controller 302 may output only the logical address No. 2 (LBA2) as the output logical address OLBA so that the read operation is performed on the logical address No. 2 (LBA2). The main controller 211 may control the memory device 220 to output the read data RD2 corresponding to the logical address No. 2 (LBA2).

The read data buffer 305 may store the read data RD1 corresponding to the logical address No. 1 (LBA1) and the read data RD2 corresponding to the logical address No. 2 (LBA2). The read data RD1 corresponding to the logical address No. 1 (LBA1) may be used in a computational operation for the row data unit No. 0 (R0), and may be reused in a computational operation for the row data unit No. 1 (R1).

The operator 306 may identify the row data unit No. 1 (R1), among the read data RD1 and RD2, based on the metadata MT_R1 of the row data unit No. 1 (R1). Specifically, the operator 306 may determine that the row data unit No. 1 (R1) has been allocated to two logical addresses because the number (Iba_total) of logical addresses is 2. Furthermore, the operator 306 may determine that the remaining part of the read data RD1 corresponding to the logical address No. 1 (LBA1), except the first 48 B of the read data RD1, is the front part of the row data unit No. 1 (R1) based on the start offset (start_offset). Furthermore, the operator 306 may identify that anterior 96 B, among the read data RD2 corresponding to the logical address No. 2 (LBA2), is the remaining part of the row data unit No. 1 (R1) based on the last offset (last_offset).

Furthermore, the operator 306 may read the element of the column No. 4 (C4) and element of the column No. 6 (C6) of the row data unit No. 1 (R1) from the read data buffer 305 based on the target offsets (tar_offset) of the operation information IF_RQ1. Furthermore, the operator 306 may perform the condition operation for the first computational operation request RQ1 on the read elements based on the condition operations (op) and constants (const) of the operation information IF_RQ1. Specifically, the operator 306 may determine that the element of the column No. 4 (C4) of the row data unit No. 1 (R1) satisfies (i.e., a pass) the condition for the first computational operation request RQ1. Furthermore, the operator 306 may determine that the element of the column No. 6 (C6) of the row data unit No. 1 (R1) satisfies (i.e., a pass) the condition for the first computational operation request RQ1. As a result, the operator 306 may determine that the row data unit No. 1 (R1) satisfies (i.e., a pass) the condition for the first computational operation request RQ1. Accordingly, the operator 306 may control the row data unit No. 1 (R1) to be output from the read data buffer 305 to the host device 100.

Similar to the aforementioned method, the computational storage device 200 may perform the SELECT operation requested by the first computational operation request RQ1 on the row data unit No. 2 (R2) to row data unit No. 6 (R6) of the table DT.

The computational storage device 200 may effectively perform a computational operation requested by a computational operation request by identifying each row data unit and each column of the table DT according to the aforementioned method, with respect to another computational operation type not a SELECT operation.

The table DT has been stored in the memory device 220 in row major ordering. According to an embodiment, a table may be stored in the memory device 220 in column major ordering. The computational function accelerator 212 may operate similar to the aforementioned method with respect to a table that has been stored in column major ordering. That is, the index controller 302 may calculate one or more logical addresses to which a target column data unit has been allocated and may generate the index IDX and the metadata MT in a column unit. Accordingly, the computational function accelerator 212 may effectively obtain a target column data unit from a table that has been stored in column major ordering in response to a computational operation request and may perform a computational operation on the target column data unit.

Figure 6:
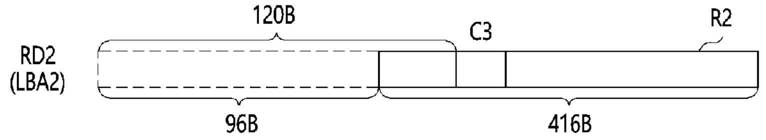
FIG. 6 is a diagram for describing a method of performing, by the computational function accelerator, a MODIFY operation by outputting only a required logical address according to an embodiment of the present disclosure.

FIG. 6 is a diagram for describing a method of performing, by the computational function accelerator 212, a MODIFY operation by outputting only a required logical address according to an embodiment of the present disclosure.

When receiving a computational operation request for a predetermined computational operation type (e.g., a MODIFY operation), the computational function accelerator 212 may output, as the output logical address OLBA, only a logical address selected among one or more logical addresses to which a target data unit has been allocated. Accordingly, the computational storage device 200 can more efficiently process a computational operation request because an unnecessary read operation is omitted.

Referring to FIG. 6, for example, the computational function accelerator 212 may receive a computational operation request to modify the element of the column No. 3 (C3) of the row data unit No. 2 (R2) of the table DT. Accordingly, the index controller 302 may generate the index IDX_R2 of the row data unit No. 2 (R2). As described above, if the index IDX_R2 of the row data unit No. 2 (R2) has already been stored in the index cache 303, the index controller 302 might not need to newly generate the index IDX_R2 of the row data unit No. 2 (R2), and may refer to the index IDX_R2 of the row data unit No. 2 (R2) that has been stored in the index cache 303. The index controller 302 may also generate the metadata MT_R2 of the row data unit No. 2 (R2).

Furthermore, the index controller 302 may determine that the column No. 3 (C3) of the row data unit No. 2 (R2) is included in the read data RD2 corresponding to the logical address No. 2 (LBA2) based on the start offset (start_offset) of the row data unit No. 2 (R2). Specifically, the index controller 302 may determine that next 8 B anterior 120 B is the column No. 3 (C3) of the row data unit No. 2 (R2) in the read data RD2 in which the row data unit No. 2 (R2) corresponds to the logical address No. 2 (LBA2). Accordingly, although the row data unit No. 2 (R2) has been allocated to the logical address No. 2 (LBA2) and the logical address No. 3 (LBA3), the index controller 302 may output only the logical address No. 2 (LBA2) as the output logical address OLBA.

The merge controller 308 may modify the element of the column No. 3 (C3) of the row data unit No. 2 (R2) in the read data RD2 corresponding to the logical address No. 2 (LBA2) based on the operation information IF and the metadata MT_R2 of the row data unit No. 2 (R2). As in the operating method described with respect to the operator 306, the merge controller 308 may identify the element of the column No. 3 (C3) of the row data unit No. 2 (R2) in the read data RD2 based on the metadata MT_R2 of the row data unit No. 2 (R2). The modified data may be output as the write data WD. Thereafter, the main controller 211 may store the write data WT corresponding to the logical address No. 2 (LBA2) in another memory region of the memory device 220, and may map the logical address No. 2 (LBA2) to a physical address of the another memory region.

If the read data RD2 corresponding to the logical address No. 2 (LBA2) has already been stored in the read data buffer 305, a read operation might not also need to be performed on the logical address No. 2 (LBA2), and a MODIFY operation is to be performed by using the read data RD2 that have already been stored in the read data buffer 305.

FIG. 7 is a diagram for describing a method of allocating, by the computational function accelerator 212, the another data ID to be added to the table DT to one or more logical addresses according to an embodiment of the present disclosure.

Referring to FIG. 7, for example, when receiving a computational operation request to add the another data ID to the table DT as another row data unit No. 1, the index controller 302 may increase the sequence number (row_num) of each of the row data unit No. 1 (R1) to the row data unit No. 6 (R6) by 1 in the indices IDX_R0 to IDX_R6 for the table DT.

Furthermore, the index controller 302 may allocate the another row data unit No. 1 to the logical addresses LBA7 and LBA8, and may generate the index IDX_NR1 of the another row data unit No. 1. The index IDX_NR1 of the another row data unit No. 1 may include 1 as the sequence number (row_num) of the row data unit. Furthermore, the index IDX_NR1 of the another row data unit No. 1 may include the logical address No. 7 (LBA7) as the start logical address (start_Iba) of the another row data unit No. 1 and include the logical address No. 8 (LBA8) as the last logical address (last_Iba) of the another row data unit No. 1. That is, a front part of the another row data unit No. 1 may be allocated to the logical address No. 7 (LBA7) after a rear part of the row data unit No. 7 (i.e., a previous row data unit No. 6). A rear part of the another row data unit No. 1 may be allocated to the logical address No. 8 (LBA8).

The front part of the another row data unit No. 1 may be merged with the rear part of the row data unit No. 7 (i.e., the previous row data unit No. 6) by the merge controller 308. Specifically, the index controller 302 may operate so that the read data RD corresponding to the logical address No. 7 (LBA7) are output by the memory device 220. The merge controller 308 may generate the write data WT by merging the rear part of the row data unit No. 7 (i.e., the previous row data unit No. 6) and the front part of the another row data unit No. 1 that are included in the read data RD corresponding to the logical address No. 7 (LBA7). The main controller 211 may store the write data WT corresponding to the logical address No. 7 (LBA7) in another memory region of the memory device 220, and may map the logical address No. 7 (LBA7) to a physical address of the another memory region.

According to an embodiment, the host device 100 can previously designate the range of logical addresses at which the table DT can be allocated to the computational storage device 200. The computational function accelerator 212 may allocate the another data ID that are added to the table DT to the logical addresses of the range designated by the host device. Accordingly, overhead of the host device 100 can be further reduced because the host device 100 does not need to manage the logical addresses to which the table DT is allocated.

Figure 8:
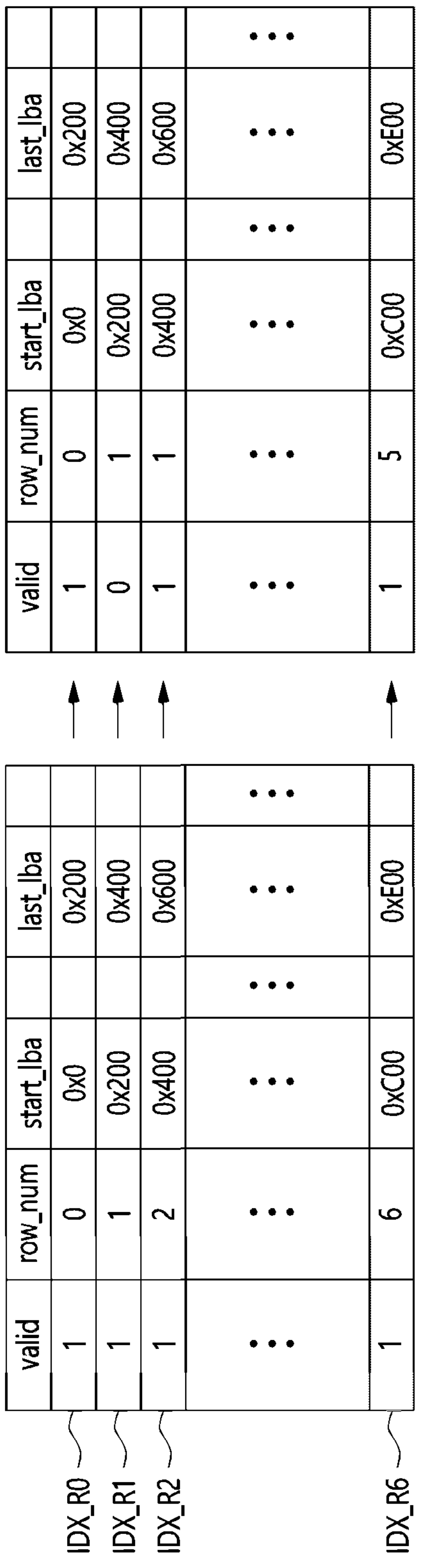
FIG. 8 is a diagram for describing a method of invalidating, by the computational function accelerator, an index that has been stored in an index cache according to an embodiment of the present disclosure.

FIG. 8 is a diagram for describing a method of invalidating, by the computational function accelerator 212, the index IDX that has been stored in the index cache 303 according to an embodiment of the present disclosure.

Referring to FIG. 8, for example, when receiving a computational operation request to remove the row data unit No. 1 (R1) from the table DT, the index controller 302 may decrease the sequence number (row_num) of each of the row data unit No. 2 (R2) to the row data unit No. 6 (R6) by 1 in the indices IDX_R0 to IDX_R6 of the table DT. Furthermore, the index controller 302 may modify validity information (valid) of the index IDX_R1 of the row data unit No. 1 (R1) so that the validity information (valid) indicates that the index IDX_R1 of the row data unit No. 1 (R1) is invalid. Thereafter, the index controller 302 may allocate the another data ID to the logical addresses LBA1 and LBA2 to which the invalidated row data unit No. 1 (R1) has been allocated by using the same method as that described with reference to FIG. 8.

The method of processing the table DT, which has been described with reference to FIGS. 2 to 8, may be similarly applied when the data unit group 221 in which each data unit has a size greater than a maximum size of data, which may be applied to each logical address, is processed.

Figure 9A:
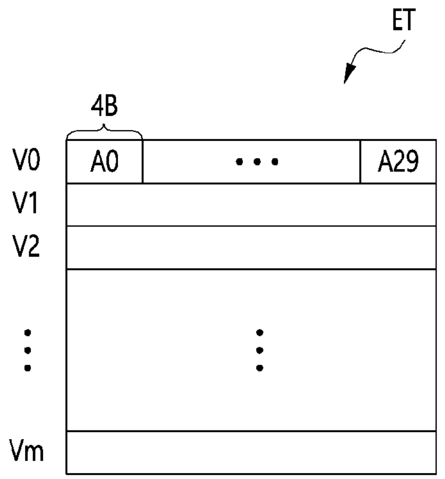
FIGS. 9A and 9B are diagrams for describing logical addresses to which a table has been allocated according to an embodiment of the present disclosure.
Figure 9B:
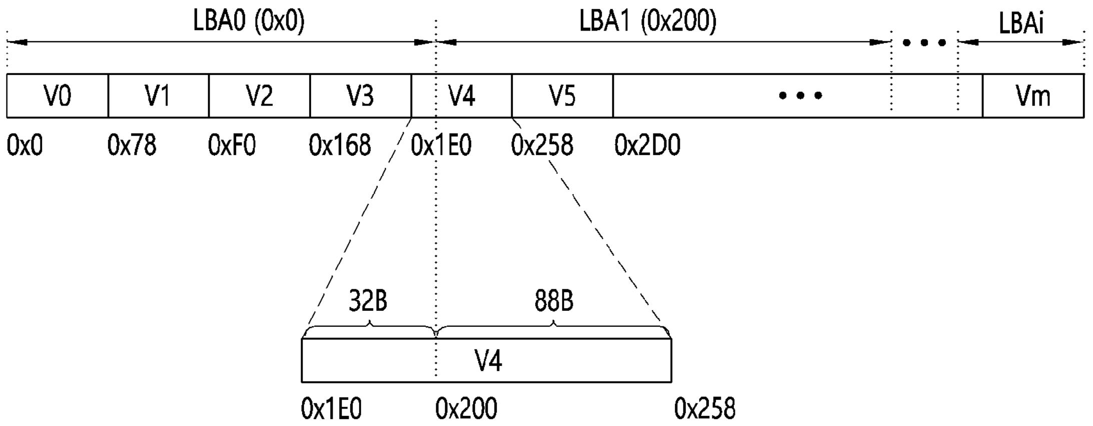

FIGS. 9A and 9B are diagrams for describing logical addresses to which a table ET has been allocated according to an embodiment of the present disclosure. The table ET may be an example of the data unit group 221 illustrated in FIG. 1.

Referring to FIG. 9A, the table ET may be an embedding table including a plurality of vector data units V0 to Vm. For example, each element included in the table ET may have a size of 4 B. The vector dimension of the table ET may be 30 (i.e., each vector data unit includes thirty elements). Accordingly, each vector data unit may have a size of 120 B. For example, a vector data unit No. 0 (V0) may include thirty elements A0 to A29. The size of each vector data unit may be less than a maximum data size, for example, 512 B which is allocable to each logical address.

Referring to FIG. 9B, when storing the table ET in the memory device 220 under the control of the host device 100, the main controller 211 may allocate the vector data units V0 to Vm that have been sequentially listed to consecutive logical addresses LBA0 to LBAi in units of 512 Bs. It may be an example that a start logical address of the table ET is the logical address No. 0 (LBA0) and 0x0. Each vector data unit may be allocated to one or two logical addresses. A vector data unit that is allocated to only one logical address might not be unaligned data, and a vector data unit that is allocated to two logical addresses may be unaligned data.

For example, all elements from the vector data unit No. 0 (V0) to the vector data unit No. 3 (V3) may be allocated to the logical address No. 0 (LBA0). Accordingly, the vector data unit No. 0 (V0) to the vector data unit No. 3 (V3) might not be unaligned data.

For example, anterior 32 B of the vector data unit No. 4 (V4) may be allocated to the logical address No. 0 (LBA0), and posterior 88 B of the vector data unit No. 4 (V4) may be allocated to the logical address No. 1 (LBA1). Accordingly, the vector data unit No. 4 (V4) may be unaligned data. The logical address No. 0 (LBA0) may be the start logical address (or a first logical address) of the vector data unit No. 4 (V4). The logical address No. 1 (LBA1) may be the last logical address (or a second logical address) of the vector data unit No. 4 (V4).

The computational storage device 200 may receive a computational operation request for the table ET from the host device 100. The operation information IF that is included in the computational operation request may selectively include information with regard to the start logical address of the table ET, a size of an element, a vector dimension, a computational operation type, and respective sequence numbers of one or more target data units (i.e., target vector data units).

The computational function accelerator 212 may process the table ET similar to the method of processing the table DT illustrated in FIG. 2. However, all of the row data units R0 to R6 of the table DT may be unaligned data, but each vector data unit of the table ET might be unaligned data or non-unaligned data. Accordingly, the index controller 302 may determine whether each vector data unit is unaligned data by calculating an unaligned flag with respect to each vector data unit.

Specifically, the index controller 302 may generate the index IDX of a target vector data unit based on the operation information IF. The index controller 302 may generate a plurality of indices corresponding to a plurality of target vector data units, respectively, based on the operation information IF.

More specifically, the index IDX of each vector data unit may include information with regard to the vector data unit, for example, validity information, the sequence number of the vector data unit, the start logical address of the vector data unit, the start offset of the vector data unit, the last logical address of the vector data unit, and the last offset of the vector data unit.

According to an embodiment, the index controller 302 may calculate information that is to be included in the index IDX of each vector data unit based on Equations F10 to F18. Equations F10 to F18 may be applicable when the data unit group or the table ET is allocated to the consecutive logical addresses and each size of the vector data units is less than a data size allocable to each logical address.

$$\text{the size (vt\_size) of a vector data unit} = \text{vt\_dim} * \text{val\_size} \quad \text{Equation 10 (F10)}$$

$$\text{the start address (vt\_start\_addr) of a vector data unit} = \text{start\_addr} + (\text{vt\_size} * \text{vt\_num}) \quad \text{Equation 11 (F11)}$$

$$\text{the start logical address (start\_lba) of a vector data unit} = (\text{vt\_start\_addr} \gg) \ll 9. \quad \text{Equation 12 (F12)}$$

$$\text{the start offset (start\_offset) of a vector data unit} = \text{vt\_start\_addr}[8:0]. \quad \text{Equation 13 (F13)}$$

-continued the unaligned flag (unaligned_flag) = Equation 14 (F14)

$$(start\_offset == 0)?\ 0$$

$$:\ [(vt\_start\_addr + vt\_size) \gg 9]\ != start\_lba?\ 1{:}0.$$

the last logical address (last_lba) of a vector data unit as the non−unaligned data = start_lba. Equation 15 (F15)

the last offset (last_offset) of a vector data unit as the non−unaligned data = start_offset + vt_size. Equation 16 (F16)

the last logical address (last_lba) of the unaligned data = start_lba + lba_size. Equation 17 (F17)

the last offset (last_offset) of the unaligned data = vt_size − (last_lba − vt_start_addr). Equation 18 (F18)

In Equation 10 (F10), the size (vt_size) of the vector data unit may be the size of one vector data unit. The parameter "vt_dim" may be the vector dimension. The parameter "val_size" may be the size of one element.

In Equation 11 (F11), the start address (vt_start_addr) of the vector data unit may be the number of bytes from the first element of the table ET to a location at which the vector data unit is started. The parameter "start_addr" may be the start logical address of the table ET. The parameter "vt_num" may be the sequence number of the vector data unit.

In Equation 12 (F12), the start logical address (start_Iba) of the vector data unit may be the foremost logical address, to which the vector data unit is allocated among one or more logical addresses.

In Equation 13 (F13), the start offset (start_offset) of the vector data unit may be the number of bytes from the foremost location of data corresponding to the start logical address (start_Iba) of the vector data unit to a location at which the vector data unit is started.

In Equation 14 (F14), the unaligned flag (unaligned_flag) may indicate whether the vector data unit is the unaligned data or not. For example, the unaligned flag (unaligned_flag) of the vector data unit as the non-unaligned data may be calculated as 0. The unaligned flag (unaligned_flag) of unaligned data may be calculated as 1.

In Equation 15 (F15) and Equation 17 (F17), the last logical address (last_Iba) of the vector data unit may be the last logical address, to which the vector data unit is allocated among one or more logical addresses. As illustrated in Equation 15 (F15), the last logical address (last_Iba) of the vector data unit as the non-unaligned data may be the same as the start logical address (start_Iba). As illustrated in Equation 17 (F17), the last logical address (last_Iba) of unaligned data may be a logical address subsequent to the start logical address (start_Iba). The Iba_size may be a size corresponding to one logical address.

In Equation 16 (F16) and Equation 18 (F18), the last offset (last_offset) of the vector data unit may be the number of bytes from the foremost location of data corresponding to the last logical address (last_Iba) of the vector data unit to a location at which the vector data unit is ended.

According to an embodiment, when a vector data unit is not unaligned data, the calculation of the last logical address (last_Iba) according to Equation 15 (F15) and the calculation of the last offset (last_offset) according to Equation 16 (F16) may be omitted. Furthermore, the operator 306 may simply obtain data corresponding to the size (vt_size) of a vector data unit from the start offset (start_offset) of the vector data unit from the read data RD corresponding to the start logical address (start_Iba) of the vector data unit.

The index controller 302 may output, as the output logical address OLBA, one or two logical addresses to which a target vector data unit has been allocated based on the index IDX of the target vector data unit. If required read data RD have already been stored in the read data buffer 305, the index controller 302 might not output a logical address corresponding to the required read data RD as the output logical address OLBA.

Furthermore, the index controller 302 may store the metadata MT of a target vector data unit in the metadata buffer 304 based on the index IDX of the target vector data unit. The metadata MT of the target vector data unit may include information on which the target vector data unit can be identified in the read data RD that are output by the memory device 220. Specifically, the metadata MT of the target vector data unit may include the sequence number of the target vector data unit, the number of logical addresses to which the target vector data unit has been allocated, the start offset of the target vector data unit, and the last offset of the target vector data unit. Accordingly, the computational function accelerator 212 can effectively perform a computational operation requested by a computational operation request by identifying a target vector data unit of the table ET based on the metadata MT of the target vector data unit.

According to an embodiment, the metadata MT of the target vector data unit may include the unaligned flag instead of the number of logical addresses to which the target vector data unit has been allocated.

Figure 10A:
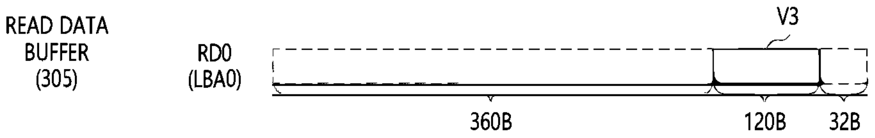
FIGS. 10A and 10B are diagrams illustrating a process of obtaining, by the computational function accelerator, a vector data unit No. 3 and vector data unit No. 4 of a table according to an embodiment of the present disclosure.
Figure 10B:
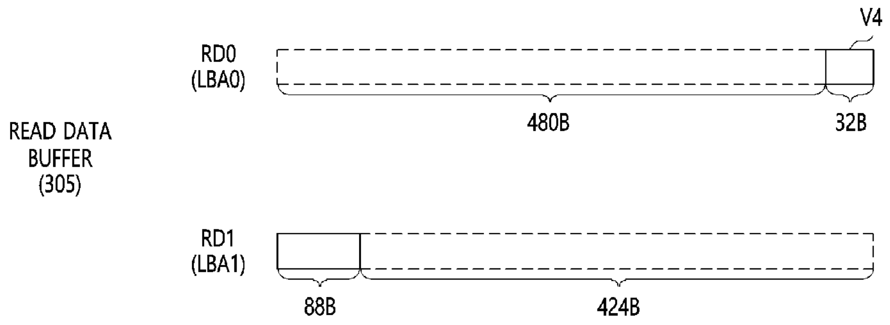

FIGS. 10A and 10B are diagrams illustrating a process of obtaining, by the computational function accelerator 212, the vector data unit No. 3 (V3) and vector data unit No. 4 (V4) of the table ET according to an embodiment of the present disclosure.

Referring to FIG. 10A, the index controller 302 may generate the index IDX_V3 of the vector data unit No. 3 (V3) based on Equation (F10) to Equation 18 (F18). As described above, if the index IDX_V3 of the vector data unit No. 3 (V3) has already been stored in the index cache 303, the index controller 302 might not newly generate the index IDX_V3 of the vector data unit No. 3 (V3). Furthermore, the index controller 302 may generate the metadata (MT_V3) of the vector data unit No. 3 (V3) and store the metadata (MT_V3) in the metadata buffer 304.

The index controller 302 may determine that the start logical address (start_Iba) of the vector data unit No. 3 (V3) is the logical address No. 0 (LBA0). The index controller 302 may determine that the vector data unit No. 3 (V3) is not unaligned data because the unaligned flag (unaligned_flag) of the vector data unit No. 3 (V3) is 0. Accordingly, the index controller 302 may determine that the last logical address (last_Iba) of the vector data unit No. 3 (V3) is the logical address No. 0 (LBA0). The index controller 302 may output the logical address No. 0 (LBA0) as the output logical address OLBA so that a read operation is performed on the logical address No. 0 (LBA0). The main controller 211 may control the memory device 220 so that read data RD0 corresponding to the logical address No. 0 (LBA0) are output.

The operator 306 may identify the vector data unit No. 3 (V3), among the read data RD, based on the metadata (MT_V3) of the vector data unit No. 3 (V3). Specifically, the operator 306 may determine that the vector data unit No. 3 (V3) has been allocated to one logical address because the number (Iba_total) of logical addresses is 1. Furthermore, the operator 306 may identify the vector data unit No. 3

(V3), among the read data RD0 corresponding to the logical address No. 0 (LBA0), based on the start offset (start_offset) and last offset (last_offset) of the vector data unit No. 3 (V3). The operator 306 may perform a computational operation on the identified vector data unit No. 3 (V3).

Referring to FIG. 10B, the index controller 302 may generate the index (IDX_V4) of the vector data unit No. 4 (V4) based on Equation 10 (F10) to Equation 18 (F18). As described above, if the index (IDX_V4) of the vector data unit No. 4 (V4) has already been stored in the index cache 303, the index controller 302 might not newly generate the index (IDX_V4) of the vector data unit No. 4 (V4). Furthermore, the index controller 302 may generate the metadata (MT_V4) of the vector data unit No. 4 (V4) and store the metadata (MT_V4) in the metadata buffer 304.

The index controller 302 may determine that the start logical address (start_Iba) of the vector data unit No. 4 (V4) is the logical address No. 0 (LBA0). The index controller 302 may determine that the vector data unit No. 4 (V4) is unaligned data because the unaligned flag (unaligned_flag) of the vector data unit No. 4 (V4) is 1. Accordingly, the index controller 302 may determine that the last logical address (last_Iba) of the vector data unit No. 4 (V4) is the logical address No. 1 (LBA1). In this case, for example, if the memory device 220 performs a read operation on the logical address No. 0 (LBA0) for a computational operation for the vector data unit No. 3 (V3) or the read data RD0 corresponding to the logical address No. 0 (LBA0) are already present in the read data buffer 305, the index controller 302 may determine that another read operation for the logical address No. 0 (LBA0) is not necessary. Accordingly, the index controller 302 may output only the logical address No. 1 (LBA1) as the output logical address OLBA so that a read operation is performed on the logical address No. 1 (LBA1). The main controller 211 may control the memory device 220 to output read data RD1 corresponding to the logical address No. 1 (LBA1).

The operator 306 may identify the vector data unit No. 4 (V4), among the read data RD0 and RD1, based on the metadata (MT_V4) of the vector data unit No. 4 (V4). Specifically, the operator 306 may determine that the vector data unit No. 4 (V4) has been allocated to two logical addresses because the number (Iba_total) of logical addresses is 2. Furthermore, the operator 306 may determine that the remaining part of the read data RD0 corresponding to the logical address No. 0 (LBA0) except the first 480 B is a front part of the vector data unit No. 4 (V4) based on the start offset (start_offset). Furthermore, the operator 306 may identify that anterior 88 B of the read data RD1 corresponding to the logical address No. 1 (LBA1) is the remaining part of the vector data unit No. 4 (V4) based on the last offset (last_offset). The operator 306 may perform a computational operation on the identified vector data unit No. 4 (V4).

The method of processing the embedding table ET, which has been described with reference to FIG. 9A to 10B, may be similarly applied when the data unit group 221 in which each data unit has a size less than a maximum size of data which may be allocated to each logical address.

According to an embodiment, the computational storage device 200 can autonomously determine one or more logical addresses to which a target data unit has been allocated although the one or more logical addresses to which the target data unit for a computational operation has been allocated are not received from the host device 100. Furthermore, the computational storage device 200 can identify a target data unit in read data corresponding to logical addresses although the size of the target data unit is not identical with a size corresponding to the logical addresses. As a result, the computational storage device 200 can effectively perform a computational operation requested by the host device 100, and performance of the data processing system 10 can be improved.

The above description is merely a description of the technical spirit of the present technology, and those skilled in the art may change and modify the present technology in various ways without departing from the essential characteristic of the present technology. Accordingly, the disclosed embodiments should not be construed as limiting the technical spirit of the present technology but should be construed as describing the technical spirit of the present technology. The technical spirit of the present technology is not restricted by the embodiments. The range of protection of the present technology should be construed based on the following claims, and all technical spirits within an equivalent range of the present technology should be construed as being included in the scope of rights of the present technology. Therefore, the scope of the present disclosure should not be limited to the above-described embodiments but should include the equivalents thereof.

In the above-described embodiments, all operations may be selectively performed, or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

The embodiments of the present disclosure have been described in the drawings and specification. Although specific terminologies are used here, those are only to describe the embodiments of the present disclosure. Therefore, the present disclosure is not restricted to the above-described embodiments and many variations are possible within the scope of the present disclosure. It should be apparent to those skilled in the art that various modifications can be made on the basis of the technological scope of the present disclosure in addition to the embodiments disclosed herein. Furthermore, the embodiments may be combined to form additional embodiments.

What is claimed is:

1. A computational storage device comprising:

a memory device configured to store therein a data unit group including a plurality of data units; and a controller having circuitry and disposed in the computational storage device, the controller configured to:

receive a computational operation request from a host device, the computational operation request including information of a start logical address of the data unit group and a size of each of the plurality of data units, calculate, based on the information, one or more logical addresses, to which a target data unit that is included in the data unit group has been allocated and is a target of a computational operation to be performed in response to the computational operation request, calculate a start logical address and a start offset of the target data unit based on the information, the start logical address being included in the one or more logical addresses, read, from the memory device, data corresponding to the one or more logical addresses, identify the target data unit in the read data, and transmit an operation result of the computational operation on the target data unit to the host device, wherein when the data unit group is a database table, the plurality of data units correspond to respective rows or columns included in the database table, and when the data unit group is an embedding table, the plurality of data units correspond to respective vectors included in the embedding table, and wherein the controller is further configured to calculate, when the target data unit is unaligned data, a last logical address and a last offset of the target data unit based on the information.

2. The computational storage device according to claim 1, wherein the start offset corresponds to a number of bytes from a foremost location of the read data, which corresponds to the start logical address of the target data unit, to a location at which the target data unit starts.

3. The computational storage device according to claim 1, wherein the last offset corresponds to a number of bytes from a foremost location of the read data, which corresponds to the last logical address, to a location at which the target data unit ends.

4. The computational storage device according to claim 1, wherein:

the controller is further configured to generate an index of the target data unit to store the index in an index cache, and the index includes the start logical address, the start offset, the last logical address and the last offset of the target data unit.

5. The computational storage device according to claim 1, wherein the controller comprises:

a metadata buffer configured to store metadata of the target data unit, the metadata including information of a number of the one or more logical addresses, the start offset and the last offset; and an operator configured to:

identify the target data unit in the read data based on the metadata, and perform the computational operation on the target data unit.

6. The computational storage device according to claim 1, wherein the controller is further configured to determine the target data unit is unaligned when the target data unit has a size greater than a maximum data size that is allocable to one logical address.

7. The computational storage device according to claim 1, wherein the controller is further configured to:

calculate, when the target data unit has a size less than a maximum data size that is allocable to one logical address, an unaligned flag indicating whether the target data unit is the unaligned data, and determine whether the target data unit is the unaligned data based on the unaligned flag.

8. The computational storage device according to claim 1, wherein the controller is configured to:

convert the logical address into a physical address, and control the memory device to output, to the controller, the read data from a memory region corresponding to the physical address.

9. The computational storage device according to claim 1, wherein:

the controller comprises an index cache for storing indices of the plurality of data units, and the controller is further configured to refer, when an index of the target data unit has already been stored in the index cache, to the index of the target data unit that has been stored in the index cache to calculate the one or more logical addresses.

10. The computational storage device according to claim 1, wherein the controller is further configured to:

modify respective sequence numbers of data units subsequent to the target data unit among the plurality of data units and invalidate the target data unit, in response to a first subsequent computational operation request for removing the target data unit from the data unit group, and allocate, to another target data unit, the one or more logical addresses in response to a second subsequent computational operation request for adding the other target data unit to the data unit group.

11. A computational storage device comprising:

a memory device configured to store therein a data unit group including a plurality of data units; and a controller having circuitry and disposed in the computational storage device, the controller configured to:

receive a computational operation request from a host device, the computational operation request including information of a start logical address of the data unit group and a size of each of the plurality of data units, calculate, based on the information, a first logical address, to which a selected part of a target data unit included in the data unit group has been allocated, and an unaligned flag for the target data unit, calculate, when the target data unit is determined to be unaligned data according to the unaligned flag, a second logical address, to which a remaining part of the target data unit has been allocated, read, from the memory device, first read data corresponding to the first logical address and second read data corresponding to the second logical address, obtain the target data unit from the first read data and the second read data, and transmit an operation result of a computational operation on the target data unit, in response to the computational operation request, to the external host device, wherein, when the data unit group is an embedding table, the plurality of data units correspond to respective vectors included in the embedding table.

12. The computational storage device according to claim 11, wherein the computational operation request is-further includes information of a sequence number of the target data unit.

13. The computational storage device according to claim 11, wherein:

the controller is further configured to calculate a start address of the target data unit based on the information, the controller calculates the first logical address and the unaligned flag based on the start address, and the start address corresponds to a number of bytes from a location at which the data unit group starts to a location at which the target data unit starts.

14. The computational storage device according to claim 13, wherein the controller is further configured to:

calculate a start offset of the target data unit based on the start address, and obtain the selected part from the first read data based on the start offset, and wherein the start offset corresponds to a number of bytes from a foremost location of the first read data to the location at which the target data unit starts.

15. The computational storage device according to claim 11, wherein the controller obtains, when the target data unit is determined not to be unaligned data based on the unaligned flag, the entire target data unit from the first read data.

16. A data processing system comprising:

a computational storage device configured to allocate consecutive logical addresses to a data unit group when storing therein the data unit group; and a host device configured to transmit, to the computational storage device, a computational operation request for the data unit group, the computational operation request including information of a start logical address of the data unit group and a size of each of a plurality of data units in the data unit group, wherein the computational storage device performs a computational operation on the data unit group in response to the computational operation request, and transmits an operation result of the computational operation to the host device, wherein when the data unit group is a database table, the plurality of data units correspond to respective rows or columns included in the database table, and when the data unit group is an embedding table, the plurality of data units correspond to respective vectors included in the embedding table, wherein the computational storage device is further configured to determine, based on the information, among the plurality of data units, a target data unit on which the computational operation is to be performed, and to calculate, based on the information, when the target data unit is unaligned data, a last logical address and a last offset of the target data unit.

17. The data processing system according to claim 16, wherein the computational storage device is further configured to:

determine one or more logical addresses, to which the target data unit has been allocated, and obtain the target data unit by performing a read operation on one or more physical addresses mapped to the one or more logical addresses.

18. The data processing system according to claim 16, wherein the host device is further configured to designate a range of logical addresses to which the data unit group is allocable for the computational storage device.

* * * * *